United States Patent
Koseoglu

(10) Patent No.: US 12,084,619 B2
(45) Date of Patent: Sep. 10, 2024

(54) PROCESSES AND SYSTEMS FOR PRODUCING FUELS AND PETROCHEMICAL FEEDSTOCKS FROM A MIXED PLASTICS STREAM

(71) Applicant: Saudi Arabian Oil Company, Dhahran (SA)

(72) Inventor: Omer Refa Koseoglu, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/588,476

(22) Filed: Jan. 31, 2022

(65) Prior Publication Data
US 2023/0242821 A1  Aug. 3, 2023

(51) Int. Cl.
*C10G 1/10* (2006.01)
*B01J 8/18* (2006.01)
(Continued)

(52) U.S. Cl.
CPC .............. *C10G 1/10* (2013.01); *B01J 8/1845* (2013.01); *B01J 8/1881* (2013.01); *B01J 8/24* (2013.01); *C10G 1/002* (2013.01); *C10G 2300/1003* (2013.01); *C10G 2300/201* (2013.01); *C10G 2300/302* (2013.01); *C10G 2300/308* (2013.01);
(Continued)

(58) Field of Classification Search
CPC .. C10G 1/10; C10G 1/002; C10G 2300/1003; C10G 2300/201; C10G 2300/302; C10G 2300/308; C10G 2400/02; C10G 2400/04; B01J 8/1845; B01J 8/1881; B01J 8/24
See application file for complete search history.

(56) References Cited

U.S. PATENT DOCUMENTS 3,074,878 A  1/1963  Pappas
3,492,220 A  1/1970  Empert et al.
(Continued)

FOREIGN PATENT DOCUMENTS

FR  3054557 A1  2/2018
FR  3054558 A1  2/2018
(Continued)

OTHER PUBLICATIONS

U.S. Office Action dated Mar. 24, 2022 pertaining to U.S. Appl. No. 17/355,718, filed Jun. 23, 2021, 21 pages.
(Continued)

*Primary Examiner* — Thuan D Dang
(74) *Attorney, Agent, or Firm* — DINSMORE & SHOHL LLP

(57) ABSTRACT

Methods and systems for producing pyrolysis products from a mixed plastics stream are described herein. The method may include conducting pyrolysis of a plastic feedstock to produce a stream of plastic pyrolysis oil; feeding a catalytic cracking feed stream and a catalyst from a catalyst regenerator into a fluidized bed reactor, where the catalytic cracking feed stream comprises the plastic pyrolysis oil; cracking the catalytic cracking feed stream in the fluidized bed reactor to produce a product stream and a spent catalyst; and transporting the spent catalyst to the catalyst regenerator and regenerating the catalyst in the catalyst regenerator. The product stream comprises olefins having a carbon number of $C_2$-$C_4$ and distillate fuel.

12 Claims, 3 Drawing Sheets

(51) Int. Cl.
*B01J 8/24* (2006.01)
*C10G 1/00* (2006.01)

(52) U.S. Cl.
CPC ..... *C10G 2400/02* (2013.01); *C10G 2400/04* (2013.01)

(56) References Cited

U.S. PATENT DOCUMENTS

| | | | |
|---|---|---|---|
| 3,494,859 A | 2/1970 | Parker | |
| 3,758,403 A | 9/1973 | Rosinski et al. | |
| 3,894,931 A | 7/1975 | Nace et al. | |
| 3,894,933 A | 7/1975 | Owen et al. | |
| 3,894,934 A | 7/1975 | Owen et al. | |
| 3,960,978 A | 6/1976 | Givens et al. | |
| 4,419,221 A | 12/1983 | Castagnos, Jr. et al. | |
| 4,980,053 A | 12/1990 | Li et al. | |
| 5,216,149 A | 6/1993 | Evans et al. | |
| 5,300,704 A | 4/1994 | Evans et al. | |
| 5,321,174 A | 6/1994 | Evans et al. | |
| 5,326,465 A | 7/1994 | Yongqing et al. | |
| 5,359,061 A | 10/1994 | Evans et al. | |
| 5,359,099 A | 10/1994 | Evans et al. | |
| 5,386,070 A | 1/1995 | Evans et al. | |
| 5,462,652 A | 10/1995 | Wegerer | |
| 5,464,602 A | 11/1995 | Evans et al. | |
| 5,821,553 A | 10/1998 | Evans et al. | |
| 5,904,838 A | 5/1999 | Kalnes et al. | |
| 6,143,940 A | 11/2000 | Miller et al. | |
| 6,444,118 B1 | 9/2002 | Podrebarac et al. | |
| 6,656,346 B2* | 12/2003 | Ino | C10G 11/18 585/653 |
| 6,822,126 B2 | 11/2004 | Miller | |
| 8,277,643 B2 | 10/2012 | Huber et al. | |
| 8,864,984 B2 | 10/2014 | Huber et al. | |
| 9,169,442 B2 | 10/2015 | Huber et al. | |
| 9,428,695 B2 | 8/2016 | Narayanaswamy et al. | |
| 9,447,332 B2 | 9/2016 | Narayanaswamy et al. | |
| 9,453,166 B2 | 9/2016 | Huber et al. | |
| 9,458,394 B2 | 10/2016 | Dean et al. | |
| 9,896,627 B2 | 2/2018 | Koseoglu | |
| 10,308,896 B2 | 6/2019 | Scheibel et al. | |
| 10,442,997 B2 | 10/2019 | Narayanaswamy et al. | |
| 10,858,593 B2 | 12/2020 | Ramamurthy et al. | |
| 10,975,313 B2 | 4/2021 | Ramamurthy et al. | |
| 2003/0042175 A1 | 3/2003 | Debuisschert et al. | |
| 2003/0199717 A1 | 10/2003 | Miller | |
| 2003/0199718 A1 | 10/2003 | Miller | |
| 2009/0151233 A1 | 6/2009 | Miller | |
| 2012/0108866 A1 | 5/2012 | Grenoble et al. | |
| 2016/0362609 A1 | 12/2016 | Ward et al. | |
| 2017/0101592 A1 | 4/2017 | Green | |
| 2018/0002609 A1 | 1/2018 | Narayanaswamy et al. | |
| 2018/0023010 A1 | 1/2018 | Leflaive et al. | |
| 2018/0155638 A1 | 6/2018 | Al-Ghamdi et al. | |
| 2019/0153338 A1 | 5/2019 | Charra et al. | |
| 2020/0017773 A1 | 1/2020 | Ramamurthy et al. | |
| 2021/0189250 A1 | 6/2021 | Timken | |
| 2021/0332300 A1* | 10/2021 | Timken | C08J 11/12 |

FOREIGN PATENT DOCUMENTS

| | | |
|---|---|---|
| KR | 102004522 B1 | 7/2019 |
| WO | 2021201932 A1 | 10/2021 |

OTHER PUBLICATIONS

Notification of Transmittal of the International Search Report and Written Opinion of the International Searching Authority, or the Declaration dated Feb. 22, 2023 pertaining to International application No. PCT/US2022/049245 filed Nov. 8, 2022, pp. 1-13.

* cited by examiner

PROCESSES AND SYSTEMS FOR PRODUCING FUELS AND PETROCHEMICAL FEEDSTOCKS FROM A MIXED PLASTICS STREAM

BACKGROUND

Field

The present disclosure generally relates to processes and systems for chemical cracking of pyrolysis products produced from a mixed plastics stream, and more specifically, to processes and systems to prepare the products of plastic pyrolysis as distillate fuels and light olefins through fluidized catalytic cracking of plastic pyrolysis oil.

Technical Background

Plastic is a synthetic or semisynthetic organic polymer composed of mainly carbon and hydrogen. Further, plastics tend to be durable, with a slow rate of degradation, therefore they stay in the environment for a long time and are not prone to rapid breakdown upon disposal. Pure plastics are generally insoluble in water and nontoxic. However, additives used in plastic preparation are toxic and may leach into the environment. Examples of toxic additives include phthalates. Other typical additives include fillers, colorant, plasticizers, stabilizers, anti-oxidants, flame retardants, ultraviolet (UV) light absorbers, antistatic agents, blowing agents, lubricants used during its preparation to change its composition and properties.

Plastics pyrolyze at high temperatures and polymers can be converted back to their original monomers or smaller polymers as gas or liquid and can be recovered. However, the additives added to the plastic during production present challenges in effectively utilizing the recovered products from pyrolysis. Upon pyrolysis, the additives end-up in the pyrolysis products and thus require further processing to generate useful products.

BRIEF SUMMARY

Accordingly, there is a clear and long-standing need to provide a solution to utilize the pyrolysis products generated from the pyrolysis of plastics. To utilize such pyrolysis products the residue left from the additives in the pyrolysis product must be removed or the pyrolysis products utilized in a manner that the residue is not destructive. The present disclosure addresses such long-standing need for the disposal of plastics and utilization of pyrolysis products generated from the pyrolysis of plastics by utilizing generated plastic pyrolysis oil as feedstock for fluidized catalytic cracking (FCC).

Crude oils are traditionally refined to produce transportation fuels and petrochemical feedstocks, but as demonstrated by the present disclosure, plastic pyrolysis oil may alternatively be utilized as a feedstock to generate such transportation fuels and petrochemical feedstocks. Typically fuels for transportation are produced by processing and blending of distilled fractions from the crude to meet the particular end use specifications. After initial atmospheric and/or vacuum distillation, fractions are converted into products by various catalytic and non-catalytic processes. One such process is fluidized catalytic cracking (FCC) processes. In FCC processes, the feed is catalytically cracked over a fluidized catalyst bed. The main product from such processes has conventionally been gasoline, although other products are also produced in smaller quantities via FCC processes such as liquid petroleum gas and cracked gas oil, but light olefins useful as petrochemical feedstock are additionally produced in accordance with the methods of the present disclosure. Coke deposited on the catalyst is burned off in a regeneration zone at relatively high temperatures in the presence of air before being recycled back to the reaction zone.

In accordance with one embodiment of the present disclosure, plastic feedstock may be converted to transportation fuels and petrochemical feedstocks through plastic pyrolysis and fluidized catalytic cracking. A method of producing pyrolysis products from a mixed plastics stream includes (a) conducting pyrolysis of a plastic feedstock to produce a stream of plastic pyrolysis oil; (b) feeding a catalytic cracking feed stream and a catalyst from a catalyst regenerator into a fluidized bed reactor, where the catalytic cracking feed stream includes the plastic pyrolysis oil; (c) cracking the catalytic cracking feed stream in the fluidized bed reactor to produce a product stream and a spent catalyst; and (d) transporting the spent catalyst to the catalyst regenerator and regenerating the catalyst in the catalyst regenerator. The product stream includes olefins having a carbon number of $C_2$-$C_4$ and distillate fuel. Further, the plastic pyrolysis oil includes a naphtha fraction representing hydrocarbons with boiling points from 36 to 180° C. a diesel fraction representing hydrocarbons with boiling points from 180 to 370° C., and a vacuum gas oil fraction representing hydrocarbons with boiling points greater than 370° C.

In accordance with another embodiment of the present disclosure, a system for processing mixed plastics into plastic pyrolysis products including transportation fuels and petrochemical feedstocks may comprise an inlet stream comprising mixed plastics; a plastic pyrolysis unit, the plastic pyrolysis unit in fluid communication with the inlet stream, and operable to generate a stream of plastic pyrolysis oil from the inlet stream at a plastic pyrolysis oil outlet; a fluidized bed reactor comprising a catalyst inlet and a catalytic cracking feed stream inlet; a catalyst regenerator in fluidic communication with the catalyst inlet of the fluidized bed reactor; a catalyst that circulates from the catalyst regenerator to the fluidized bed reactor and back to the catalyst regenerator; and a catalytic cracking feed stream disposed in the fluidized bed reactor that reacts with the catalyst. The catalytic cracking feed stream inlet is in fluid communication with the plastic pyrolysis oil outlet such that a catalytic cracking feed stream is disposed in the fluidized bed reactor that reacts with the catalyst to generate a product stream. Further, the catalytic cracking feed stream comprises the plastic pyrolysis oil and the plastic pyrolysis oil comprises a naphtha fraction representing hydrocarbons with boiling points from 36 to 180° C., a diesel fraction representing hydrocarbons with boiling points from 180 to 370° C., and a vacuum gas oil fraction representing hydrocarbons with boiling points greater than 370° C.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

It is to be understood that both the foregoing general description and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and together with the description serve to explain the principles and operations of the technology. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
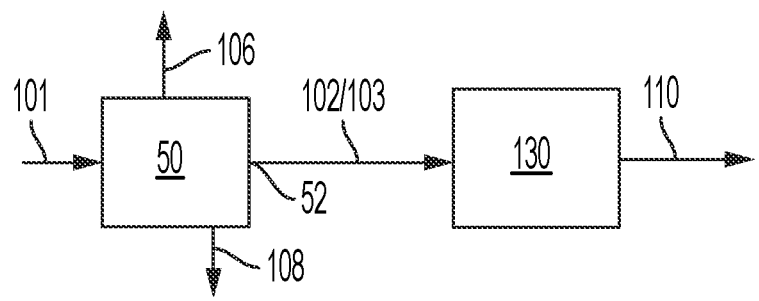
FIG. 1 is a schematic illustration of one or more embodiments of the present disclosure, in which a plastic feedstock is pyrolized to generate a plastic pyrolysis oil which is subsequently converted to olefins having a carbon number of $C_2$-$C_4$ and distillate fuel via fluidized catalytic cracking.

For the purpose of this simplified schematic illustration and description, the numerous valves, temperature sensors, electronic controllers and the like that are customarily employed and well known to those of ordinary skill in the art of certain refinery operations are not included. Further, accompanying components that are in conventional refinery operations including FCC processes such as, for example, air supplies, catalyst hoppers, and flue gas handling are not necessarily shown.

It should further be noted that arrows in the drawings refer to pipes, conduits, channels, or other physical transfer lines that connect by fluidic communication one or more system apparatuses to one or more other system apparatuses. Additionally, arrows that connect to system apparatuses define inlets and outlets in each given system apparatus.

DETAILED DESCRIPTION

Reference will now be made in greater detail to various embodiments, some embodiments of which are illustrated in the accompanying drawings. Whenever possible, the same reference numerals will be used throughout the drawings to refer to the same or similar parts. Generally, disclosed herein are various embodiments of systems and methods for producing pyrolysis products from a mixed plastics stream through generation of a plastic pyrolysis oil via pyrolysis of a plastic feedstock and cracking the plastic pyrolysis oil in an integrated FCC unit. Generally, the FCC unit includes a fluidized bed reactor. Catalyst and the plastic pyrolysis oil are fed into the fluidized bed reactor and the plastic pyrolysis oil is cracked to form a desired product. The spent catalyst is separated from the product, is regenerated, and is again fed into the fluidized bed reactor along with additional plastic pyrolysis oil.

As used herein, "fuel" may include: a solid carbonaceous composition such as coal, coal derived liquids, tars, oil shales, oil sands, tar sand, biomass, wax, coke, or the like; a liquid carbonaceous composition such as gasoline, oil, petroleum, diesel, jet fuel, ethanol, or the like; and a gaseous composition such as syngas, carbon monoxide, hydrogen, methane, gaseous hydrocarbon gases ($C_1$-$C_4$), hydrocarbon vapors, or the like.

As used herein, the term "downer" refers to a reactor, such as a fluidized bed reactor, where the reactant flows in a generally downward direction such as, for example, entering the top and exiting the bottom of the reactor. Downers may be utilized in embodiments of down-flow FCC reactor apparatuses described herein. Likewise, the term "riser" refers to a reactor, such as a fluidized bed reactor, where the reactant flows in a generally upward direction such as, for example, entering the bottom and exiting the top of the reactor. Downers may be utilized in embodiments of up-flow FCC reactor apparatuses described herein.

As used herein, "spent catalyst" refers to catalyst which has undergone reaction with fuel and is at least partially coked. Also, as used herein, "regenerated catalyst" refers to catalyst that is exiting the catalyst regenerator and is at least partially or substantially free of coke, and "fresh catalyst" refers to catalyst that is newly entering the system and is at least partially or substantially free of coke.

A method of producing pyrolysis products from a mixed plastics stream includes conducting pyrolysis of a plastic feedstock to produce a stream of plastic pyrolysis oil, feeding a catalytic cracking feed stream and a catalyst from a catalyst regenerator into a fluidized bed reactor where the catalytic cracking feed stream comprises the plastic pyrolysis oil, cracking the plastic pyrolysis oil in the fluidized bed reactor to produce a product stream and a spent catalyst, and transporting the spent catalyst to the catalyst regenerator and regenerating the catalyst in the catalyst regenerator. The product stream generated in the fluidized bed reactor comprises olefins having a carbon number of $C_2$-$C_4$ and distillate fuel. Further, the plastic pyrolysis oil generated through pyrolysis of the plastic feedstock comprises a naphtha fraction representing hydrocarbons with boiling points from 36 to 180° C., a diesel fraction representing hydrocarbons with boiling points from 180 to 370° C., and a vacuum gas oil fraction representing hydrocarbons with boiling points greater than 370° C.

The associated system for processing mixed plastics into plastic pyrolysis products includes an inlet stream comprising mixed plastics, a plastic pyrolysis unit, a fluidized bed reactor, a catalyst regenerator, a catalytic cracking feed stream, and a catalyst. The plastic pyrolysis unit is provided in fluid communication with the inlet stream and is operable to generate a stream of plastic pyrolysis oil forming at least a portion of a catalytic cracking feed stream. The fluidized bed reactor comprises a catalyst inlet and a catalytic cracking feed stream inlet. The catalytic cracking feed stream inlet is in fluid communication with the plastic pyrolysis oil outlet such that the catalytic cracking feed stream may be disposed in the fluidized bed reactor for reaction with the catalyst to generate a product stream. Further, the catalyst regenerator is provided in fluidic communication with the fluidized bed reactor such that the catalyst circulates from the catalyst regenerator to the fluidized bed reactor and back to the catalyst regenerator.

Having generally described the various embodiments of systems and methods for producing pyrolysis products from a mixed plastics stream through generation of a plastic pyrolysis oil and cracking the plastic pyrolysis oil in an integrated FCC unit, embodiments of the same are described in further detail and with reference to the various Figures.

Referring to FIG. 1, a schematic illustration of one or more generalized embodiments of the present disclosure is presented. An inlet stream 101 comprising mixed plastics is provided to a plastic pyrolysis unit 50. The plastic pyrolysis unit 50 is in fluid communication with the inlet stream 101 and is operable to generate a stream of plastic pyrolysis oil 102 from the inlet stream 101 at a plastic pyrolysis oil outlet 52. An FCC unit 130 is in fluid communication with the plastic pyrolysis oil outlet 52 of the plastic pyrolysis unit 50 and is operable to crack a catalytic cracking feed stream 103 comprising the plastic pyrolysis oil 102 into a product stream 110. In embodiments where the stream of plastic pyrolysis oil 102 is provided to the FCC unit 130 without any further processing the catalytic cracking feed stream 103 is noted as being synonymous with the stream of plastic pyrolysis oil 102. The product stream 110 generally comprises olefins having a carbon number of $C_2$-$C_4$ and distillate fuel.

Plastic Feedstock

In one or more embodiments, the inlet stream 101 comprises a plastic feedstock including mixed plastics of differing compositions. The plastic feedstock provided to the plastic pyrolysis unit 50 may be a mixture of plastics from various polymer families. In various embodiments, the plastic feedstock may comprise plastics representative of one or more of the polymer families disclosed in Table 1. Specifically, the plastic feedstock may comprise plastics representative of one or more of olefins, carbonates, aromatic polymers, sulfones, fluorinated hydrocarbon polymers, chlorinated hydrocarbon polymers, and acrylonitriles. Further, the plastic feedstock provided to the plastic pyrolysis unit 151 may be a mixture of high density polyethylene (HDPE, for example, a density of about 0.93 to 0.97 grams per cubic centimeter (g/cm$^3$), low density polyethylene (LDPE, for example, about 0.910 g/cm$^3$ to 0.940 g/cm$^3$), polypropylene (PP), linear low density polyethylene (LLDPE), polystyrene (PS), polyethylene terephthalate (PET). It will be appreciated that utilization of the mixed plastics feedstock allows for recycling of plastics without necessitating fine sorting of the plastics.

TABLE 1

Example Polymers

| Polymer family | Example polymer | Melting Point, °C. | Structure |
|---|---|---|---|
| Olefins | Polyethylene (PE) | 115-135 | |
| Olefins | Polypropylene (PP) | 115-135 | |
| carbonates | diphenylcarbonate | 83 | |
| aromatics | Polystyrene (PS) | 240 | |
| Sulfones | Polyether sulfone | 227-238 | |
| Fluorinated hydrocarbons | Polytetrafluoroethylene (PTFE) | 327 | |

TABLE 1-continued

Example Polymers

| Polymer family | Example polymer | Melting Point, °C. | Structure |
|---|---|---|---|
| Chlorinated hydrocarbons | Polyvinyl chloride (PVC) | 100-260 | 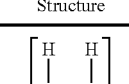 |
| Acyrilnitriles | Polyacrylonitrile (PAN) | 300 | 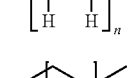 |

The plastics of the inlet stream 101 may be provided in a variety of different forms. The plastics may be in the form of a powder in smaller scale operations. The plastics may be in the form of pellets, such as those with a particle size of from 1 to 5 millimeter (mm) for larger scale operations. In further embodiments, the plastics may be provided as a chopped or ground product. Further, the plastics of the inlet stream 101 may be natural, synthetic or semi-synthetic polymers. In various embodiments, the plastics of the inlet stream 101 may comprise waste plastic, manufacturing off-spec product, new plastic products, unused plastic products, as well as their combinations.

Plastic Pyrolysis

The plastic pyrolysis unit 50 converts the inlet stream 101 of plastics to gaseous products, liquid products, and solid material. The liquid products are provided as an effluent from the plastic pyrolysis unit 50 via the plastic pyrolysis oil outlet 52 as the stream of plastic pyrolysis oil 102. The stream of gaseous products are generically shown in the various figures as off-gas stream 106. The gaseous products in the off-gas stream 106 may include various species such as hydrogen and hydrocarbon gases (C1-C4), carbon monoxide (CO), carbon dioxide ($CO_2$), and other acid gases. The generated solid material is generically shown in the various figures as solids stream 108.

The specific reactor used as the plastic pyrolysis unit 50 can be of different types and are not limited for the purposes of the present disclosure. One skilled in the art will appreciate that typical reactor types that can be used to serve the function of the plastic pyrolysis unit 50 are tank reactors, rotary kilns, packed beds, bubbling and circulating fluidized bed and others. In one or more embodiments, the pyrolysis of the plastic feedstock in the inlet stream 101 is performed in the presence or absence of a pyrolysis catalyst at a temperature of 300 to 1000° C. In various further embodiments, the plastic pyrolysis unit 50 may operate at a low severity at a temperature less than or equal to 450° C., at a high severity at a temperature at a temperature greater than 450° C., at a temperature of 300 to 450° C., at a temperature of 450 to 1000° C., at a temperature of 450 to 750° C., at a temperature of 600 to 1000° C., or at a temperature of 750 to 1000° C. In various embodiments, the plastic pyrolysis unit 50 may operate at a pressure in the range of 1 to 100 bars, 1 to 50 bars, 1 to 25 bars, or 1 to 10 bars. Further, in various embodiments, the residence time of the plastic feedstock in the plastic pyrolysis unit 50 may be 1 to 3600 seconds, 60 to 1800 seconds, or 60 to 900 seconds.

Catalytic Cracking Feed Stream

Figure 2:
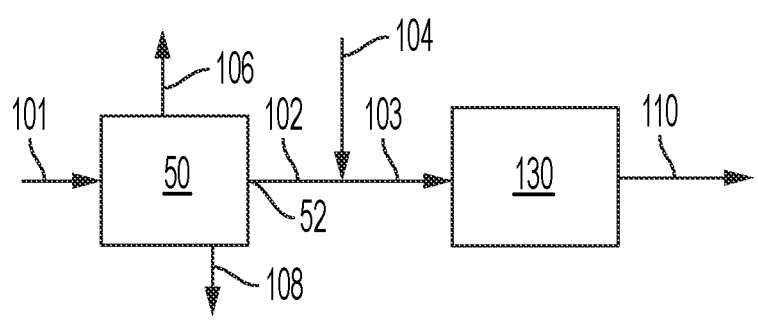
FIG. 2 is a schematic illustration in accordance with FIG. 1 where the plastic pyrolysis oil is combined with a secondary hydrocarbon stream before fluidized catalytic cracking.

In one or more embodiments, the stream of plastic pyrolysis oil 102 exiting the plastic pyrolysis unit 50 may be mixed with refinery fractions. Referring to FIG. 2, a schematic illustration of one or more generalized embodiments of the present disclosure is presented with illustration of a secondary hydrocarbon stream 104 being combined with the plastic pyrolysis oil 102 prior to introduction to the FCC unit 130. Specifically, the composition of plastic pyrolysis oil in the stream of catalytic cracking feed stream 103 as fed to the FCC unit 130 may vary from 0.1 weight percent (wt. %) to 100 wt. % with the remainder comprising the secondary hydrocarbon stream 104. In various embodiments, the composition of plastic pyrolysis oil in the stream of catalytic cracking feed stream 103 as fed to the FCC unit 130 may comprise 0.1 to 100 wt. % plastic pyrolysis oil, 20 to 100 wt. % plastic pyrolysis oil, 40 to 100 wt. % plastic pyrolysis oil, 60 to 100 wt. % plastic pyrolysis oil, 80 to 100 wt. % plastic pyrolysis oil, or substantially 100 wt. % plastic oil. In one or more embodiments, the secondary hydrocarbon stream 104 may be a conventional FCC feedstock stream such as hydrocracker bottoms, virgin or hydrotreated vacuum gas oil, deasphalted oil (DAO), coker gas oil, cycle oil, visbroken oil, atmospheric residue.

Figure 3:
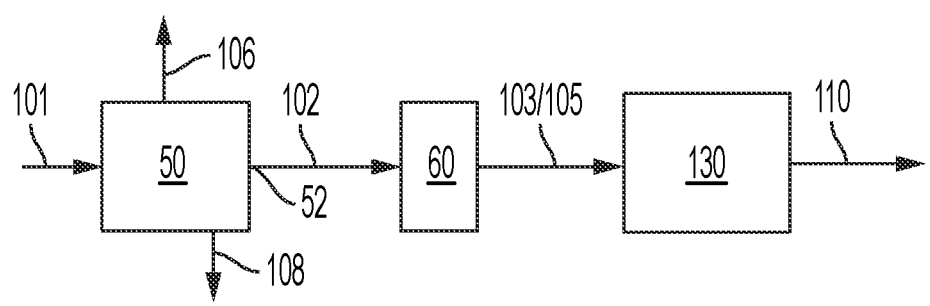
FIG. 3 is a schematic illustration in accordance with FIG. 1 where the plastic pyrolysis oil undergoes a demetallization operation before fluidized catalytic cracking.

With reference to FIG. 3, in one or more embodiments, the plastic pyrolysis oil 102 may be provided to a demetallization operation 60 to remove metallic constituents from the plastic pyrolysis oil 102 and generate a stream of demetallized plastic pyrolysis oil 105. As such, the catalytic cracking feed stream 103 would comprise the demetallized plastic pyrolysis oil 105 in place of the plastic pyrolysis oil 102. It will further be appreciated that in one or more embodiments, the demetallization operation 60 may be positioned subsequent to the juncture of the plastic pyrolysis oil 102 and the secondary hydrocarbon stream 104 such that the constituents of both the plastic pyrolysis oil 102 and the secondary hydrocarbon stream 104 undergo demetallization prior to introduction to the FCC unit 130.

In one or more embodiments, the demetallization operation 60 may be catalytic hydrodemetallization. U.S. Pat. No. 8,491,779, incorporated by reference, teaches the integration of catalytic hydrodemetallization (HDM) into a refinery process. The HDM step is carried out in the presence of a catalyst and hydrogen. Further, in one or more embodiments, the hydrogen that is used can come from a downstream step. The HDM is generally carried out at 370 to 450° C. and pressure of 30 to 200 bars. Also, see U.S. Pat. No. 5,417,846, incorporated by reference, teaching HDM, as well as U.S. Pat. Nos. 4,976,848; 4,657,664; 4,166,026; and 3,891,541, all of which are incorporated by reference.

In one or more embodiments, the demetallization operation 60 may be solvent deasphalting. The process of solvent deasphalting results in the metal containing hydrocarbons of the processed streaming end up in an asphaltenes stream of a solvent deasphalting unit. U.S. Pat. No. 7,566,394, incorporated by reference, teaches details of a solvent deasphalting process.

Fluidized Bed Reactor

Embodiments of FCC unit 130 and processes and methods incorporating the FCC unit 130 will now be described. In exemplary embodiments, the FCC unit 130 may be a downer FCC unit 130a, described below with reference to FIG. 4, or a riser FCC unit 130b, described below with reference to FIG. 5. Both the downer FCC unit 130a and the riser FCC unit 130b include a fluidized bed reactor 113 such that the catalytic cracking feed stream 103 is at least partially cracked to generate the product stream 110.

Figure 4:
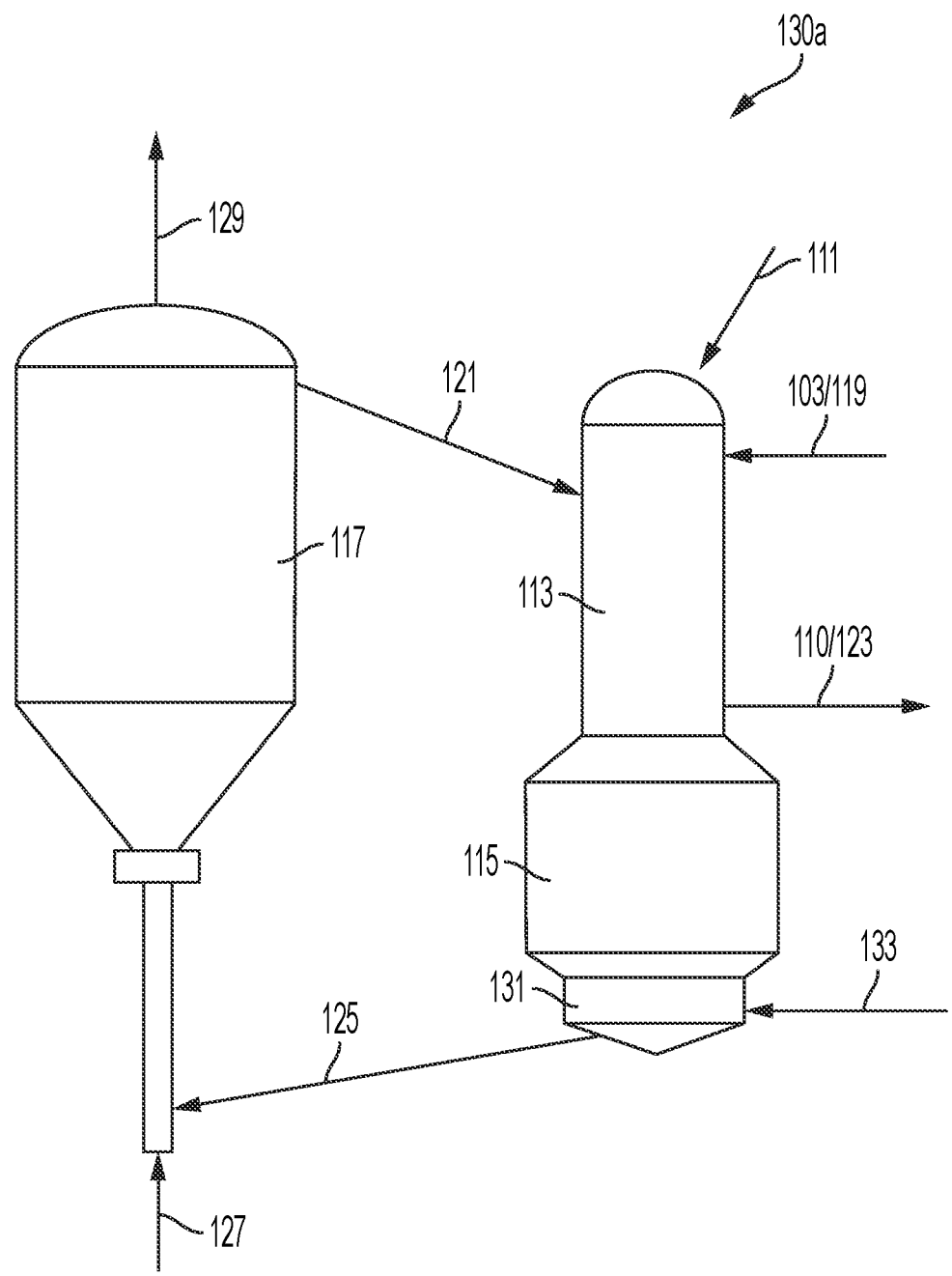
FIG. 4 is a generalized diagram of a downer FCC reactor apparatus, according to one or more embodiments described herein.

Referring to the process-flow diagram of FIG. 4, the downer FCC unit 130a may be used in the processes described herein. The downer FCC unit 130a includes a reactor-separator unit 111 comprising a fluidized bed reactor 113 and a separation zone 115. The downer FCC unit 130a also includes a catalyst regenerator 117 for regenerating spent catalyst. Catalyst may generally circulate through the catalyst regenerator 117, into the fluidized bed reactor 113, and back into the catalyst regenerator 117.

During operation of the downer FCC unit 130a, the catalytic cracking feed stream 103 is introduced as a feed into the fluidized bed reactor 113 through a transfer line 119. In some embodiments, the catalytic cracking feed stream 103 may be introduced into the fluidized bed reactor 113 with steam or other suitable gas for atomization of the feed. A quantity of heated fresh or hot regenerated solid cracking catalyst particles from the catalyst regenerator 117 may also be transferred to a withdrawal well or hopper (not shown) at the top of the fluidized bed reactor 113. Fresh catalyst may be heated from an energy source or by contact with regenerated catalyst particles. The regenerated catalyst may be heated by the heat generated from the oxidation reactions during coke removal. The quantity of catalyst may be sufficient to crack the catalytic cracking feed stream 103 to a desired product profile. The catalyst particles may be transferred to the catalyst inlet of the fluidized bed reactor 113, for example, through a downwardly directed transfer line 121 such as a conduit or pipe, commonly referred to as a transfer line or standpipe. Hot catalyst flow may be allowed to stabilize to ensure the hot catalyst is uniformly directed into a mixing zone or a feed injection portion of the fluidized bed reactor 113. In some embodiments, transfer line 121, the transfer line 119, or both are oriented relative to the fluidized be reactor 113 to introduce the catalyst and catalytic cracking feed stream 103, respectively, into the upper portion or top of the fluidized bed reactor 113.

The catalytic cracking feed stream 103 may be injected into a mixing zone of the fluidized bed reactor 113. For example, the catalytic cracking feed stream 103 may enter the fluidized bed reactor 113 through feed injection nozzles. In some embodiments, the feed injection nozzles may be situated proximate to where the regenerated catalyst particles are introduced into the fluidized bed reactor 113. In some embodiments, for example, multiple injection nozzles may be used to aid thorough and uniform mixing of the catalytic cracking feed stream 103 and the catalyst. When the catalytic cracking feed stream 103 contacts hot catalyst in the fluidized bed reactor 113, cracking reactions begin to occur. The reaction vapor of hydrocarbon cracked products, unreacted feed, and catalyst mixture quickly flow through the remainder of the fluidized bed reactor 113 and into a rapid separation zone 115 at a bottom portion of reactor-separator unit 111. Cracked and uncracked hydrocarbons of the product stream 110 may be directed through a conduit or pipe 123 to a conventional product recovery section known in the art.

If necessary for temperature control, a quench injection may be provided near the bottom of the fluidized bed reactor 113 immediately before the separation zone 115. This quench injection quickly reduces or stops the cracking reactions and can be utilized for controlling cracking severity, for example, to increase process flexibility.

The reaction temperature in the fluidized bed reactor 113, that is the outlet temperature of the fluidized bed reactor 113, may be controlled by opening and closing a catalyst slide valve (not shown) that controls a flow of regenerated catalyst from the catalyst regenerator 117 into the top of the fluidized bed reactor 113. At least a portion of the heat required for the endothermic cracking reaction may be supplied by the regenerated catalyst which has acquired heat in the regeneration process in the catalyst regenerator 117. By changing the flow rate of the hot regenerated catalyst, the operating severity or cracking conditions can be controlled in the fluidized bed reactor 113 to produce the desired yields of fuel products such as, for example, light olefinic hydrocarbons and gasoline.

The downer FCC unit 130a, for example in the reactor-separator unit 111, may include a stripper 131 for separating fuel from spent catalyst. After passing through the stripper 131, the spent catalyst may be transferred to the catalyst regenerator 117. The catalyst from separation zone 115 flows to the lower section of the stripper 131 that includes a catalyst stripping section into which a suitable stripping gas, such as steam, is introduced through transfer line 133. The stripper 131 may include several baffles or structured packing (not shown), over which the downwardly flowing spent catalyst passes in a counter-current manner to the flowing stripping gas. The upwardly flowing stripping gas, which is typically steam, is used to "strip" or remove any additional hydrocarbons that remain in the catalyst pores or between catalyst particles.

In the downer FCC unit 130a, the stripped or spent catalyst may be transported through transfer line 125, for example, by lift forces from combustion air supplied through transfer line 127 and into the bottom portion of the catalyst regenerator 117. This spent catalyst, which can also be contacted with additional combustion air, undergoes controlled combustion, through which any accumulated coke on the spent catalyst is burned off. Flue gases are removed from the catalyst regenerator 117 via conduit 129. In the catalyst regenerator 117, the heat produced from the combustion of the by-product coke may be transferred to the fluidized bed reactor 113 through the catalyst in transfer line 121 and transfer line 122. Thereby, at least a portion of the thermal energy required for the endothermic cracking reaction in the fluidized bed reactor 113 may be provided from heat produced during catalyst regeneration in the catalyst regenerator 117.

Downer reactors (downers) in general include introduction of feed at the top of the reactor with downward flow and shorter residence time as compared to up-flow reactors (risers).

In general, the operating conditions for the fluidized bed reactor 113 of a suitable downer FCC unit 130a include: a reaction temperature of from about 450° C. to about 700° C., in certain embodiments about 500° C. to about 675° C., and in further embodiments about 550° C. to about 650° C.; reaction pressure of from about 1 kg/cm$^2$ to about 20 kg/cm$^2$, in certain embodiments about 1 kg/cm$^2$ to about 10 kg/cm$^2$, in further embodiments about 1 kg/cm$^2$ to about 3 kg/cm$^2$; contact time (in the reactor) of from about 0.1 seconds to about 30 seconds, in certain embodiments about 0.1 seconds to about 20 seconds, and in further embodiments about 0.1 seconds to about 10 seconds; and a catalyst-to-feed ratio on a weight basis of from about 3:1 to about 60:1, in certain embodiments about 4:1 to about 50:1, and in further embodiments about 6:1 to about 40:1. It is noted that the flow rate of the catalyst entering the fluidized bed reactor 113 from the catalyst regenerator 117 divided by the flow rate of the catalytic cracking feed stream 103 entering the fluidized bed reactor 113 defines the catalyst-to-feed ratio for the downer FCC unit 130a.

Figure 5:
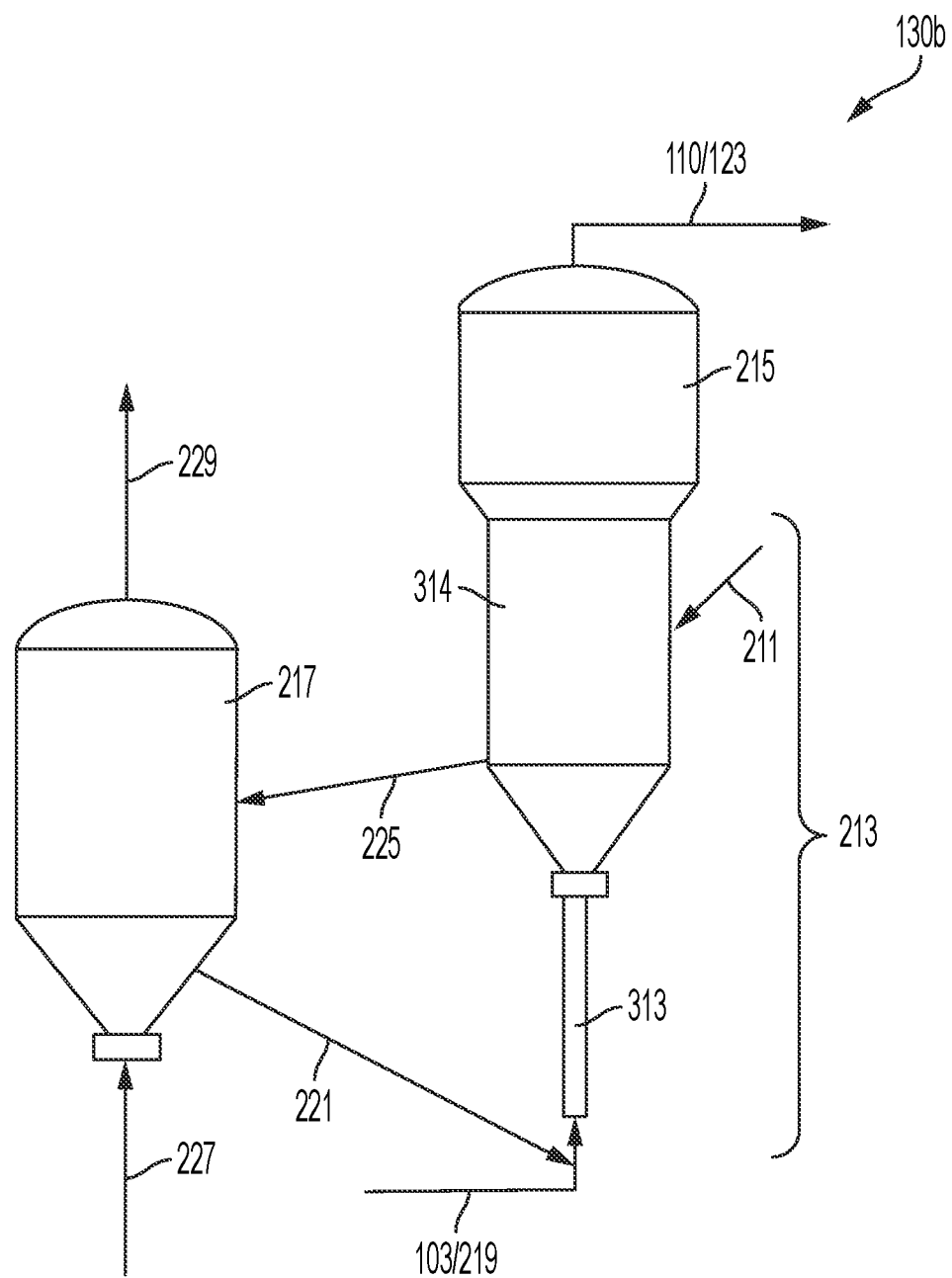
FIG. 5 is a generalized diagram of a riser FCC reactor apparatus, according to one or more embodiments described herein.

Referring to the generalized process flow diagram of FIG. 5, a riser FCC unit 130b may be used in the systems and processes according to the present disclosure. The riser FCC unit 130b includes a reactor-separator 211 having the fluidized bed reactor zone 213 and a separation zone 215. The fluidized bed reactor zone 213 includes a riser reactor 313 and a solid separation zone 314. It will be appreciated that the separation zone 215 will provide further separation of solids and reduces the likelihood of solids remaining in the product stream 110. The solid separation zone 314 may comprise a cyclone. The riser FCC unit 130b also includes a catalyst regenerator 217 for regenerating spent catalyst.

The catalytic cracking feed stream 103 may be conveyed as a feed to the fluidized bed reactor zone 213 via a transfer line 219. In some embodiments, the catalytic cracking feed stream 103 may be accompanied in the transfer line 219 by steam or other suitable gas for atomization of the feed. Atomization of the feed may facilitate admixture and intimate contact with a quantity of heated fresh or regenerated solid cracking catalyst particles sufficient for desired cracking of the catalytic cracking feed stream 103 in the fluidized bed riser reactor 313. The catalyst particles may be conveyed to the fluidized bed reactor zone 213 via transfer line 221 from the catalyst regenerator 217. The catalytic cracking feed stream 103 and the cracking catalyst are contacted under conditions to form a suspension that is introduced into the fluidized bed reactor 312.

In a continuous process using the riser FCC unit 130b, the mixture of cracking catalyst and the catalytic cracking feed stream 103 proceed upward through the fluidized bed riser reactor 313. In the fluidized bed rise reactor 313 the hot cracking catalyst particles catalytically crack hydrocarbon molecules by carbon-carbon bond cleavage. The reaction vapor of hydrocarbon cracked products, unreacted feed, and catalyst mixture quickly flows through the remainder of the remainder of the fluidized bed reactor zone 213. As the reaction proceeds, the reacting components are moved upward through the riser.

During the reactions in the fluidized bed reactor zone 213 and more specifically the riser reactor 313, as is conventional in FCC operations, the cracking catalysts may become coked. In coked catalysts, access to active catalytic sites is limited or nonexistent. Reaction products from the riser FCC unit 130b may be separated from the coked catalyst using any suitable configuration known in FCC units, generally referred to as the separation zone 215 in the riser FCC unit 130b. The separation zone 215 may be located at the top of the reactor-separator 211 above the solid separation zone 314. The separation zone 215 can include any suitable apparatus known to those of ordinary skill in the art such as, for example, cyclones. The reaction product may be withdrawn through transfer line 223 as the product stream 110.

Catalyst particles containing coke deposits from fluid cracking of the hydrocarbon feedstock pass from the solid separation zone 314, separation zone 215, or both through a transfer line 225 to the catalyst regenerator 217. In the catalyst regenerator 217, the coked catalyst contacts a stream of oxygen-containing gas, such as pure oxygen or air, which enters the catalyst regenerator 217 via a transfer line 227. The catalyst regenerator 217 may be operated in a configuration and under conditions that are known in typical FCC operations. For instance, catalyst regenerator 217 can operate as a fluidized bed to produce regeneration off-gas comprising combustion products that is discharged through a transfer line 229. The hot regenerated catalyst may be transferred from catalyst regenerator 217 through transfer line 221 to the bottom portion of the fluidized bed reactor zone 213 at the riser reactor 313 for admixture with the catalytic cracking feed stream 103 as noted above.

In general, the operating conditions for the fluidized bed riser reactor 313 of a suitable riser FCC unit 130b include: a reaction temperature of from about 450° C. to about 700° C., in certain embodiments about 500° C. to about 675° C., and in further embodiments about 550° C. to about 650° C.; reaction pressure of from about 1 kg/cm$^2$ to about 20 kg/cm$^2$, in certain embodiments about 1 kg/cm$^2$ to about 10 kg/cm$^2$, in further embodiments about 1 kg/cm$^2$ to about 3 kg/cm$^2$; contact time (in the reactor) of from about 0.1 seconds to about 30 seconds, in certain embodiments about 2 seconds to about 20 seconds, and in further embodiments about 5 seconds to about 10 seconds; and a catalyst-to-feed ratio of from about 3:1 to about 20:1, in certain embodiments about 4:1 to about 10:1, and in further embodiments about 6:1 to about 8:1. It is noted that the flow rate of the catalyst entering the fluidized bed reactor zone 213 from the catalyst regenerator 217 divided by the flow rate of the catalytic cracking feed stream 103 entering the fluidized bed reactor zone 213 defines the catalyst-to-feed ratio for riser FCC unit 130b.

A catalyst that is suitable for the particular charge and the desired product may be conveyed to the fluidized catalytic cracking reactor. In certain embodiments, to promote formation of olefins and minimize olefin-consuming reactions, such as hydrogen-transfer reactions, an FCC catalyst mixture is used in the FCC unit, including an FCC base cracking catalyst (fluidized cracking base catalyst) and an FCC catalyst additive (catalyst additive).

In particular, a matrix of an FCC base cracking catalyst may include natural or synthetic zeolites including one or more Y-type zeolite, clays such as kaolin, montmorilonite, halloysite and bentonite, and/or one or more inorganic porous oxides such as alumina, silica, boria, chromia, magnesia, zirconia, titania and silica-alumina. In one or more embodiments the FCC base cracking catalyst comprises Ultrastable Y (USY) zeolite. A suitable FCC base cracking catalyst may have a bulk density of 0.5 g/mL to 1.0 g/mL, an average particle diameter of 50 µm to 90 µm, a surface area of 50 m$^2$/g to 350 m$^2$/g and a pore volume of 0.05 mL/g to 0.5 mL/g.

A suitable FCC catalyst mixture may contain, in addition to an FCC base cracking catalyst, an FCC catalyst additive containing a shape-selective zeolite. The shape selective zeolite referred to herein means a zeolite having a pore diameter that is smaller than that of Y-type zeolite, so that hydrocarbons with only limited shapes can enter the zeolite through its pores. Suitable shape-selective zeolite components include ZSM-5 zeolite, beta zeolite, zeolite omega, SAPO-5 zeolite, SAPO-11 zeolite, SAPO34 zeolite, and pentasil-type aluminosilicates, for example. Zeolites may be post modified by incorporation of one or more atom into the framework or in the zeolite cavity. The one or more incorporated atoms can be titanium, zirconium, gallium, hafnium, boron, or combinations thereof. Combinations of one or more of the delineated shape-selective zeolites may also be utilized. The content of the shape-selective zeolite in the FCC catalyst additive is generally in the range of from about 20 wt. % to 70 wt. %, and in certain embodiments from about 30 wt. % to 60 wt. %.

A suitable FCC catalyst additive may have a bulk density of 0.5 g/mL to 1.0 g/mL, an average particle diameter of 50 µm to 90 µm, a surface area of 10 $m^2/g$ to 200 $m^2/g$, and a pore volume of 0.01 mL/g to 0.3 mL/g.

In some embodiments, the FCC catalyst mixture may contain from 60 wt. % to 95 wt. % FCC base cracking catalyst, based on the total weight of the FCC catalyst mixture. The FCC catalyst mixture may contain from 5 wt. % to 40 wt. % FCC catalyst additive, based on the total weight of the FCC catalyst mixture. If the weight fraction of the FCC base cracking catalyst in the FCC catalyst mixture is lower than 60 wt. %, or if the weight fraction additive in the FCC catalyst mixture is higher than 40 wt. %, the yield of olefins having a carbon number of $C_2$-$C_4$ and distillate fuel may not be optimal, because of low conversions of the catalytic cracking feed stream 103. If the weight fraction of the FCC base cracking catalyst in the FCC catalyst mixture is higher than 95 wt. %, or if the weight fraction of the FCC catalyst additive in the FCC catalyst mixture is lower than 5 wt. %, the yield of olefins having a carbon number of $C_2$-$C_4$ and distillate fuel may not be optimal, despite high conversion of the catalytic cracking feed stream 103.

Examples

The various embodiments of methods and systems for to prepare the products of plastic pyrolysis as distillate fuels and light olefins through fluidized catalytic cracking of plastic pyrolysis oil will be further clarified by the following examples. The examples are illustrative in nature, and should not be understood to limit the subject matter of the present disclosure.

Example 1

A plastic feed 101 comprising a mixture of HDPE, LDPE, PP, LLDPE, PS, and PET was provided to a plastic pyrolysis unit 50 and processed to generate a gas fraction, a liquid fraction, and a solid fraction. The gas fraction included $C_1$-$C_4$ hydrocarbon gases as well as other contaminant gases. For example, sulfur containing polymer may release hydrogen sulfide, nitrogen containing may release ammonia or nitrogen, and oxygen containing may release water or oxygen. The solid fraction is generated from additives added to the plastics during the manufacturing process and are generally generated at a parts per billion level of metallic components. The liquid fraction from the plastic pyrolysis unit 50 is provided as a stream of plastic pyrolysis oil 102. The concentration of metallic components in the plastic pyrolysis oil are provided in Table 2 where for clarity it is noted that "<" means "less than". Further properties and composition of the plastic pyrolysis oil 102 are shown in Tables 3A and 3B.

TABLE 2

Metallic Concentrations in Plastic Pyrolysis Oil

| Composition | Unit | Value |
| --- | --- | --- |
| Ag | ppbw | <5 |
| Al | ppbw | <300 |
| As | ppbw | 34 |
| Ba | ppbw | <100 |
| Ca | ppbw | <3,000 |
| Cd | ppbw | <3 |
| Co | ppbw | <5 |
| Cr | ppbw | 4 |
| Cu | ppbw | <50 |
| Fe | ppbw | 3,043 |
| Hg | ppbw | <3 |
| K | ppbw | <200 |
| Li | ppbw | <20 |
| Mg | ppbw | <200 |
| Mn | ppbw | <10 |
| Mo | ppbw | <1 |
| Na | ppbw | <500 |
| Ni | ppbw | <10 |
| P | ppbw | 335 |
| Pb | ppbw | <2 |
| S | ppbw | 52,738 |
| Sb | ppbw | <5 |
| Se | ppbw | <10 |
| Sn | ppbw | 41 |
| Sr | ppbw | <10 |
| Ti | ppbw | <5 |
| V | ppbw | <5 |
| Zn | ppbw | <250 |

TABLE 3A

Example Plastic Pyrolysis Oil Composition

| Composition | Unit | Value |
| --- | --- | --- |
| Density | $kg/m^3$ | 790 |
| Chlorine | ppmw | 130 |
| Nitrogen | ppmw | 1139 |
| Sulfur | ppmw | 82 |
| Oxygen | ppmw | 1562 |
| Metals | ppmw | 65 |
| Di-olefins | W % | 19.6 |
| Mono-Olefins | W % | 9.6 |

TABLE 3B

Example Plastic Pyrolysis Oil Composition Boiling Range Breakdown

| Composition | Unit | Value |
| --- | --- | --- |
| Naphtha (36-180° C.) | W % | 30.6 |
| Diesel (180 370° C.) | W % | 59.0 |
| VGO (370° C.) | W % | 10.4 |

Example 2

A plastic pyrolysis oil, properties of which are given in Tables 3A and 3B, was fluid catalytically cracked in an ACE unit. The plastic pyrolysis oil was cracked at 520° C., 600° C., and 650° C. in repeated trials with a 30 second residence time and a nominal catalyst-to-oil ratio of 6. The catalyst used was CAN-FCC3 (Ti and Zr post modified USY zeolite, alumina binder, clay and kaolin) and a ZSM-5 catalyst additive. The catalyst to additive ratio was 9:1 on a wt %:wt % basis. The operating conditions and product yields are summarized in Table 4. It is noted that the catalyst and additive were deactivated by steaming at 810° C. for 6 hours in a separate unit prior to testing

TABLE 4

Catalytic Cracking Operating Parameters and Product Yields

| Property/Composition | 520° C. | 600° C. | 650° C. |
|---|---|---|---|
| Catalyst-to-Oil Ratio (wt.:wt.) | 5.6 | 5.9 | 5.9 |
| Conversion (wt. %) | 32.9 | 48.1 | 61.9 |
| C1 + C2 + H2 (wt. %) | 0.54 | 3.54 | 9.36 |
| LPG (wt. %) | 5.90 | 5.53 | 3.56 |
| Ethylene (wt. %) | 1.20 | 4.88 | 10.63 |
| Propylene (wt. %) | 11.64 | 18.18 | 21.80 |
| Butylenes (wt. %) | 12.57 | 14.89 | 15.08 |
| Gasoline (wt. %) | 57.71 | 45.18 | 33.50 |
| Cycle Oils (wt. %) | 9.38 | 6.69 | 4.63 |
| Coke (wt. %) | 1.07 | 1.12 | 1.45 |

As seen in Table 4, the pyrolysis oil resulted in an increase in light olefins such as ethylene, propylene, and butylenes and a reduction in gasoline in the product stream as the cracking temperature was increased. Specifically, the gasoline fraction was reduced from 57.71 wt. % to 33.50 wt. % with a cracking temperature increase from 520° C. to 650° C. Similarly the total light olefins (as measured by the total of ethylene, propylene, and butylenes) increased from 25.41 wt. % to 47.51 wt. % with a cracking temperature increase from 520° C. to 650° C. As such, it is demonstrated that the products generated from the plastic pyrolysis oil may be tuned to achieve desired products at least in part with adjustment of the catalytic cracking temperature.

Example 3

The plastic pyrolysis oil obtained in Example 1 was blended with a hydrocracker bottoms stream, which is a conventional FCC feedstock. The composition and properties of the hydrocracker bottoms stream and the plastic pyrolysis oil are provided in Table 5. Two blends were prepared with 5 wt % and 20 wt % plastic pyrolysis oil. The blends were fluid catalytically cracked in an ACE unit. The tests were conducted at 520° C. with a 30 second residence time and at a catalyst-to oil-ratio in the range 5.6-6.1 (nominal 6). The catalyst used was CAN-FCC3 and a ZSM-5 catalyst additive. The catalyst to additive ratio was 9:1 on a wt %:wt % basis. The operating conditions and product yields are summarized in Table 6. It is noted that the catalyst and additive were deactivated by steaming at 810° C. for 6 hours in a separate unit prior to testing. An additional trial at the same operation conditions was completed with the pure hydrocracker bottoms stream for comparison.

TABLE 5

Composition and Properties of Feedstreams

| Property/Composition | Unit | Method | Hydrocracker Bottoms | Plastic Pyrolysis Oil |
|---|---|---|---|---|
| API | ° | ASTM D4052 | 33.4 | 54.4 |
| Sp. Gravity | | ASTM D4058 | 0.8579 | 0.7610 |
| Sulfur by XRF | ppmw | ASTM D4294 | 87 | 82 |
| Total Nitrogen | ppmw | ASTM D4629 | 27 | 1139 |
| Micro Carbon Residue | wt % | ASTM D4530 | 0 | 0 |
| Viscosity @50° C. | cSt % | ASTM D445 | 20.8015 | |
| Viscosity @100° C. | cSt % | ASTM D445 | 5.7318 | |
| Viscosity @21° C. | cSt % | ASTM D7042 | | 1.853 |
| Viscosity @38° C. | cSt % | ASTM D7042 | | 1.453 |
| SIMDIS-HT | | | ASTM D6352 | ASTM D2887 |
| Initial Boiling Point (IBP) | ° C. | | 250 | 32 |
| 5 wt % | ° C. | | 347 | 66 |
| 10 wt % | ° C. | | 372 | 96 |
| 20 wt % | ° C. | | 397 | 132 |
| 30 wt % | ° C. | | 413 | 149 |
| 40 wt % | ° C. | | 428 | 193 |
| 50 wt % | ° C. | | 443 | 233 |
| 60 wt % | ° C. | | 459 | 267 |
| 70 wt % | ° C. | | 477 | 298 |
| 80 wt % | ° C. | | 497 | 326 |
| 90 wt % | ° C. | | 524 | 355 |
| 95 wt % | ° C. | | 545 | 378 |
| Final Boiling Point (FBP) | | | | |

TABLE 6

Catalytic Cracking Operating Parameters and Product Yields

| Property/Composition | Hydrocracker Bottoms | Blend 1 | Blend 2 | Plastic Pyrolysis Oil |
|---|---|---|---|---|
| Plastic Pyrolysis Oil Content (wt. %) | 0 | 5 | 20 | 100 |
| Hydrocracker Bottoms Content (wt. %) | 100 | 95 | 80 | 0 |
| Conversion (wt. %) | 52.8 | 47.2 | 47.2 | 32.9 |
| Temperature (° C.) | 520 | 520 | 520 | 520 |
| Catalyst-to-Oil Ratio (wt.:wt.) | 6.9 | 6.1 | 6.6 | 5.6 |
| C1 + C2 + H2 (wt. %) | 1.1 | 1.3 | 1.4 | 0.5 |
| LPG (wt. %) | 21.4 | 17.9 | 17.1 | 5.9 |
| Ethylene (wt. %) | 4.5 | 4.1 | 4.0 | 1.2 |
| Propylene (wt. %) | 12.6 | 12.2 | 12.0 | 11.6 |
| Butylenes (wt. %) | 10.8 | 10.4 | 10.6 | 12.6 |
| Gasoline (wt. %) | 37.4 | 41.5 | 39.6 | 57.7 |
| Cycle Oils (wt. %) | 9.7 | 11.3 | 13.2 | 9.4 |
| Coke (wt. %) | 2.5 | 1.3 | 2.1 | 1.1 |

As seen in Table 6, the pyrolysis oil contributes to the generation of ethylene, propylene and butylenes as well as gasoline. While the generation of ethylene, propylene, and butylene as a wt. % of the generated products remains fairly stable, the generation of gasoline is noticeably increased with utilization of the plastic pyrolysis oil. Specifically, the gasoline fraction was increased from 37.4 wt. % to 57.7 wt. % with conversion of the feed stream from pure hydrocracker bottoms to pure plastic pyrolysis oil.

Based on the foregoing, it should now be understood that various aspects of method and systems for producing fuels and petrochemical feedstocks from a mixed plastics stream are disclosed herein.

According to a first aspect of the present disclosure, a method of producing pyrolysis products from a mixed plastics stream comprises (a) conducting pyrolysis of a plastic feedstock to produce a stream of plastic pyrolysis oil: (b) feeding a catalytic cracking feed stream and a catalyst from a catalyst regenerator into a fluidized bed reactor, where the catalytic cracking feed stream comprises the plastic pyrolysis oil: (c) cracking the catalytic cracking feed stream in the fluidized bed reactor to produce a product stream and a spent catalyst; and (d) transporting the spent catalyst to the catalyst regenerator and regenerating the catalyst in the catalyst regenerator; where the product stream comprises olefins having a carbon number of $C_2$-$C_4$ and distillate fuel, and where the plastic pyrolysis oil comprises a naphtha fraction representing hydrocarbons with boiling points from 36 to 180° C., a diesel fraction representing hydrocarbons with boiling points from 180 to 370° C. and a vacuum gas oil fraction representing hydrocarbons with boiling points greater than 370° C.

A second aspect includes the method of the first aspect, in which the plastic pyrolysis oil comprises oxygen, sulfur, nitrogen, and chlorine containing compounds.

A third aspect includes the method of the first or second aspects, in which the method further comprises feeding the plastic pyrolysis oil to a demetallization operation to remove metallic constituents from the plastic pyrolysis oil and generate a stream of demetallized plastic pyrolysis oil, and the catalytic cracking feed stream comprises the demetallized plastic pyrolysis oil in place of the plastic pyrolysis oil.

A fourth aspect includes the method of any of the first through third aspects, in which the catalytic cracking feed stream further comprises a conventional FCC feedstock stream.

A fifth aspect includes the method of any of the first through fourth aspects, in which the distillate fuel comprises gasoline.

A sixth aspect includes the method of any of the first through fifth aspects, in which the method further comprises atomizing the catalytic cracking feed stream before feeding the catalytic cracking feed stream into the fluidized bed reactor.

A seventh aspect includes the method of any of the first through sixth aspects, in which the spent catalyst is separated from the product stream in a separation zone.

An eighth includes the method of any of the first through seventh aspects, in which the spent catalyst comprises coke deposits.

A ninth aspect includes the method of any of the first through eighth aspects, in which the fluidized bed reactor is operated at a reaction temperature of 450 to 700° C.

A tenth aspect includes the method of any of the first through ninth aspects, in which the fluidized bed reactor is operated at a reaction pressure of 1 to 3 bar.

An eleventh aspect includes the method of any of the first through tenth aspects, in which the catalytic cracking feed stream has a residence time of 0.1 to 30 seconds in the fluidized bed reactor.

A twelfth aspect includes the method of any of the first through eleventh aspects, in which the flow rate of the catalyst entering the fluidized bed reactor from the catalyst regenerator divided by the flow rate of the catalytic cracking feed stream entering the fluidized bed reactor defines a catalyst-to-feed ratio and the catalyst-to-feed ratio is in the range of 3:1 to 60:1.

A thirteenth aspect includes the method of any of the first through twelfth aspects, in which the catalyst comprises a fluidized cracking base catalyst and a catalyst additive.

A fourteenth aspect includes the method of the thirteenth aspect, in which the fluidized cracking base catalyst comprise USY zeolite.

A fifteenth aspect includes the method of the thirteenth or fourteenth aspect, in which the fluid cracking base catalyst has a bulk density of 0.5 g/ml to 1.0 g/ml, an average particle diameter of 50 microns to 90 microns, a surface area of 50 $m^2$/g to 350 $m^2$/g and a pore volume of 0.05 ml/g to 0.5 ml/g.

A sixteenth aspect includes the method of any of the thirteenth through fifteenth aspects, in which the catalyst additive includes a shape-selective zeolite.

A seventeenth aspect includes the method of the sixteenth aspect, in which the shape selective zeolite comprises an average pore diameter that is less than the average pore diameter of Y-type zeolite.

A eighteenth aspect includes the method of the sixteenth or seventeenth aspect, in which the shape selective zeolite is selected from the group consisting of ZSM-5 zeolite, zeolite omega, SAPO-5 zeolite, SAPO-11 zeolite, SAPO-34 zeolite, pentasil-type aluminosilicate, and their combinations.

A nineteenth aspect includes the method of any of the sixteenth through eighteenth aspects, in which the shape selective zeolite has a bulk density of 0.5 g/ml to 1.0 g/ml, an average particle diameter of 50 microns to 90 microns, a surface area of 10 $m^2$/g to 200 $m^2$/g and a pore volume of 0.01 ml/g to 0.3 ml/g.

A twentieth aspect includes the method of any of the thirteenth through nineteenth aspects, in which the catalyst comprises 5 W % to 40 W % of the catalyst additive.

A twenty-first aspect includes the method of the twentieth aspect, in which the catalyst additive comprises about 20 W % to about 70 W % of a shape-selective zeolite.

A twenty-second aspect includes the method of any of the first through twenty-first aspects, in which the fluidized bed reactor is a downer.

A twenty-third aspect includes the method of any of the first through twenty-first aspects, in which the fluidized bed reactor is a riser.

A twenty-fourth aspect includes the method of any of the first through twenty-third aspects, in which the plastic feedstock comprises mixed plastics of differing compositions.

A twenty-fifth aspect includes the method of any of the first through twenty-fourth aspects, in which the pyrolysis of a plastic feedstock is performed in the presence of a catalyst at a temperature of 300° C. to 1000° C.

According to a twenty-sixth aspect of the present disclosure, a system for processing mixed plastics into plastic pyrolysis products comprise an inlet stream comprising mixed plastics; a plastic pyrolysis unit, the plastic pyrolysis unit in fluid communication with the inlet stream, and operable to generate a stream of plastic pyrolysis oil from the inlet stream at a plastic pyrolysis oil outlet; a fluidized bed reactor comprising a catalyst inlet and a catalytic cracking feed stream inlet; a catalyst regenerator in fluidic communication with the catalyst inlet of the fluidized bed reactor; a catalyst that circulates from the catalyst regenerator to the fluidized bed reactor and back to the catalyst regenerator; and a catalytic cracking feed stream disposed in the fluidized bed reactor that reacts with the catalyst, where the catalytic cracking feed stream inlet is in fluid communication with the plastic pyrolysis oil outlet such that a catalytic cracking feed stream is disposed in the fluidized bed reactor that reacts with the catalyst to generate a product stream, where the catalytic cracking feed stream comprises the plastic pyrolysis oil, and where the plastic pyrolysis oil comprises a naphtha fraction representing hydrocarbons with boiling points from 36 to 180° C., a diesel fraction representing hydrocarbons with boiling points from 180 to 370° C., and a vacuum gas oil fraction representing hydrocarbons with boiling points greater than 370° C.

A twenty-seventh aspect includes the system of the twenty-sixth aspect, in which the fluidized bed reactor is a riser.

A twenty-eighth aspect includes the system of the twenty-sixth aspect, in which the fluidized bed reactor is a downer.

A twenty-ninth aspect includes the system of any of the twenty-sixth through twenty-eighth aspects, in which the system further comprises a demetallization unit in fluid communication with the demetallization unit configured to remove metallic constituents from the plastic pyrolysis oil and generate a stream of demetallized plastic pyrolysis oil, and the catalytic cracking feed stream comprises the demetallized plastic pyrolysis oil in place of the plastic pyrolysis oil.

A thirtieth aspect includes the system of any of the twenty-sixth through twenty-ninth aspects, in which the catalytic cracking feed stream inlet is further in fluid communication with a conventional FCC feedstock stream such that the conventional FCC stream and the stream of plastic pyrolysis oil are mixed before entering the fluidized bed reactor.

A thirty-first aspect includes the system of any of the twenty-sixth through thirtieth aspects, in which the spent catalyst is separated from the product stream in a separation zone.

A thirty-second aspect includes the system of any of the twenty-sixth through thirty-first aspects, in which the fluidized bed reactor is operated at a reaction temperature of 450 to 700° C.

A thirty-third aspect includes the system of any of the twenty-sixth through thirty-second aspects, in which the fluidized bed reactor is operated at a reaction pressure of 1 to 3 bar.

A thirty-fourth aspect includes the system of any of the twenty-sixth through thirty-third aspects, in which the catalytic cracking feed stream has a residence time of 0.1 to 30 seconds in the fluidized bed reactor.

A thirty-fifth aspect includes the system of any of the twenty-sixth through thirty-fourth aspects, in which the catalyst comprises a fluidized cracking base catalyst and a catalyst additive.

A thirty-sixth aspect includes the system of the thirty-fifth aspect, in which the fluidized cracking base catalyst comprises USY zeolite.

A thirty-seventh aspect includes the system of the thirty-fifth or thirty-sixth aspect, in which the fluid cracking base catalyst has a bulk density of 0.5 g/ml to 1.0 g/ml, an average particle diameter of 50 microns to 90 microns, a surface area of 50 $m^2$/g to 350 $m^2$/g and a pore volume of 0.05 ml/g to 0.5 ml/g.

A thirty-eighth aspect includes the system of any of the thirty-fifth through thirty-seventh aspects, in which the catalyst additive includes a shape-selective zeolite.

A thirty-ninth aspect includes the system of the thirty-eighth aspect, in which the shape selective zeolite comprises an average pore diameter that is less than the average pore diameter of Y-type zeolite.

A fortieth aspect includes the system of the thirty-eighth or thirty-ninth aspect, in which the shape selective zeolite is selected from the group consisting of ZSM-5 zeolite, zeolite omega, SAPO-5 zeolite, SAPO-11 zeolite, SAPO-34 zeolite, pentasil-type aluminosilicate, and their combinations.

A forty-first aspect includes the system of any of the thirty-eighth through fortieth aspects, in which the shape selective zeolite has a bulk density of 0.5 g/ml to 1.0 g/ml, an average particle diameter of 50 microns to 90 microns, a surface area of 10 $m^2$/g to 200 $m^2$/g and a pore volume of 0.01 ml/g to 0.3 ml/g.

A forty-second aspect includes the system of any of the thirty-fifth thought forty-first aspects, in which the catalyst comprises 5 W % to 40 W % of the catalyst additive.

A forty-third aspect includes the system of the forty-second aspect, in which the catalyst additive comprises about 20 W % to about 70 W % of a shape-selective zeolite.

It should be apparent to those skilled in the art that various modifications and variations can be made to the described embodiments without departing from the spirit and scope of the claimed subject matter. Thus, it is intended that the specification cover the modifications and variations of the various described embodiments provided such modifications and variations come within the scope of the appended claims and their equivalents.

The singular forms "a", "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned. For brevity, the same is not explicitly indicated subsequent to each disclosed range and the present general indication is provided.

As used in this disclosure and in the appended claims, the words "comprise," "has," and "include" and all grammatical variations thereof are each intended to have an open, non-limiting meaning that does not exclude additional elements or steps.

What is claimed is:

1. A method of producing pyrolysis products from a mixed plastics stream, the method comprising:
   (a) conducting pyrolysis of a plastic feedstock in a plastic pyrolysis unit to produce a stream of plastic pyrolysis oil, the plastic pyrolysis oil comprising at least one metallic constituent;
   (b) feeding a catalytic cracking feed stream and a catalyst from a catalyst regenerator into a fluidized bed reactor, where the catalytic cracking feed stream comprises the plastic pyrolysis oil provided directly from the plastic pyrolysis unit without removing the at least one metallic constituent from the plastic pyrolysis oil;
   (c) cracking the catalytic cracking feed stream in the fluidized bed reactor to produce a product stream and a spent catalyst; and
   (d) transporting the spent catalyst to the catalyst regenerator and regenerating the catalyst in the catalyst regenerator;
   where the product stream comprises olefins having a carbon number of $C_2$-$C_4$ and distillate fuel, and
   where the plastic pyrolysis oil comprises a naphtha fraction representing hydrocarbons with boiling points from 36 to 180° C., a diesel fraction representing hydrocarbons with boiling points from 180 to 370° C., and a vacuum gas oil fraction representing hydrocarbons with boiling points greater than 370° ° C.

2. The method of claim 1, where the plastic pyrolysis oil comprises oxygen, sulfur, nitrogen, and chlorine containing compounds.

3. The method of claim 1, where the catalytic cracking feed stream further comprises a conventional fluid catalytic cracking feedstock stream.

4. The method of claim 1, where the distillate fuel comprises gasoline.

5. The method of claim 1, where the fluidized bed reactor is operated at a reaction temperature of 450 to 700° C., the fluidized bed reactor is operated at a reaction pressure of 1 to 3 bar, and the catalytic cracking feed stream has a residence time of 0.1 to 30 seconds in the fluidized bed reactor.

6. The method of claim 1, where the flow rate of the catalyst entering the fluidized bed reactor from the catalyst regenerator divided by the flow rate of the catalytic cracking feed stream entering the fluidized bed reactor defines a catalyst-to-feed ratio and the catalyst-to-feed ratio is in the range of 3:1 to 60:1.

7. The method of claim 1, where the catalyst comprises a fluidized cracking base catalyst and a catalyst additive.

8. The method of claim 7, where the fluidized cracking base catalyst comprises USY zeolite.

9. The method of claim 7, where the catalyst additive includes a shape-selective zeolite.

10. The method of claim 9, where the shape selective zeolite is selected from the group consisting of ZSM-5 zeolite, beta zeolite, zeolite omega, SAPO-5 zeolite, SAPO-11 zeolite, SAPO-34 zeolite, pentasil-type aluminosilicate, and their combinations.

11. The method of claim 1, where the fluidized bed reactor is a downer.

12. The method of claim 1, where the fluidized bed reactor is a riser.

* * * * *